United States Patent
Turner

(10) Patent No.: US 7,073,623 B2
(45) Date of Patent: Jul. 11, 2006

(54) ELECTRICAL STEERING SYSTEM FOR MANNED OR UNMANNED OPERATION

(75) Inventor: Christopher David Glenn Turner, Erie, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/126,480

(22) Filed: May 11, 2005

(65) Prior Publication Data

US 2005/0247513 A1 Nov. 10, 2005

(51) Int. Cl.
*B62D 5/04* (2006.01)

(52) U.S. Cl. .................. 180/446; 180/273; 701/42; 701/44

(58) Field of Classification Search ................ 180/402, 180/404, 443, 444, 445, 446, 273; 701/41, 701/42, 43, 44
See application file for complete search history.

(56) References Cited

U.S. PATENT DOCUMENTS

| | | | |
|---|---|---|---|
| 5,667,033 A | 9/1997 | Shimizu et al. | 180/272 |
| 5,709,281 A | 1/1998 | Sherwin et al. | 180/272 |
| 5,810,112 A | 9/1998 | Bailey et al. | 180/446 |
| 6,170,600 B1 | 1/2001 | Shimizu | 180/446 |
| 6,318,496 B1 | 11/2001 | Koehler et al. | 180/444 |
| 6,374,167 B1 | 4/2002 | Iwazaki | 701/41 |
| 6,408,236 B1 * | 6/2002 | Nishiwaki et al. | 701/41 |
| 6,597,141 B1 | 7/2003 | Wilson-Jones et al. | 318/560 |
| 6,619,421 B1 | 9/2003 | Tanioka | 180/444 |
| 2001/0018641 A1 | 8/2001 | Kodaka et al. | 701/301 |
| 2001/0054519 A1 | 12/2001 | Nishiwaki et al. | 180/167 |
| 2002/0016657 A1 * | 2/2002 | Iwazaki | 701/41 |
| 2002/0169531 A1 | 11/2002 | Kawazoe et al. | 701/41 |
| 2002/0189371 A1 | 12/2002 | Nakane et al. | 73/862.333 |
| 2003/0050748 A1 | 3/2003 | Iwazaki | 701/41 |
| 2003/0169005 A1 | 9/2003 | Ito et al. | 318/432 |
| 2003/0201878 A1 | 10/2003 | Bai et al. | 340/435 |

OTHER PUBLICATIONS

Are There Other Electric Power Steering Setups? [online], [retrieved on Oct. 17, 2003]. Retrieved from the Internet<URL: http://www.nsxprime.com/FAQ/technical/eps.htm>.

* cited by examiner

*Primary Examiner*—Kevin Hurley

(57) ABSTRACT

A method and system for controlling an electrical steering system supports both manned and unmanned operation of a steering system for a vehicle. A steering wheel is coupled to an electric motor shaft for rotation with the steering wheel. A torque transducer senses a torque level for any application of rotational force applied to the steering wheel. An operator detector detects a presence or absence of an operator based on the sensed torque. The steering is controlled based on the detected presence or absence of the operator.

18 Claims, 3 Drawing Sheets

ELECTRICAL STEERING SYSTEM FOR MANNED OR UNMANNED OPERATION

FIELD OF THE INVENTION

This invention relates to an electrical steering system for manned or unmanned operation of a vehicle.

BACKGROUND OF THE INVENTION

Vehicles may be classified as manned, unmanned or dual-operation. Dual-operation refers to vehicles that support both manned and unmanned operation. An unmanned vehicle may not require a steering wheel. In contrast, an operator of a manned vehicle or a dual-operation vehicle typically requires a steering wheel to direct the vehicle in the desired direction. For a dual-operation vehicle, an operator may occupy a vehicle that operates in an automatic pilot or auto-steering mode where the vehicle follows a desired path plan or trajectory. If the vehicle is presented with an obstacle in its path or deviates from the desired path plan or trajectory, the operator may desire to seize control of the steering. Thus, there is a need for detecting the presence of an operator attempting to operate a steering wheel and turning control of the vehicle to the operator.

SUMMARY OF THE INVENTION

A method and system for controlling an electrical steering system supports both manned and unmanned operation of a steering system for a vehicle. A steering wheel is coupled to an electric motor shaft for rotation with the steering wheel. A torque transducer senses a torque level for an application of rotational force applied to the steering wheel. An operator detector detects a presence or absence of an operator based on the sensed torque. The steering system is controlled based on the detected presence or absence of the operator.

DESCRIPTION OF THE PREFERRED EMBODIMENT

Figure 1:
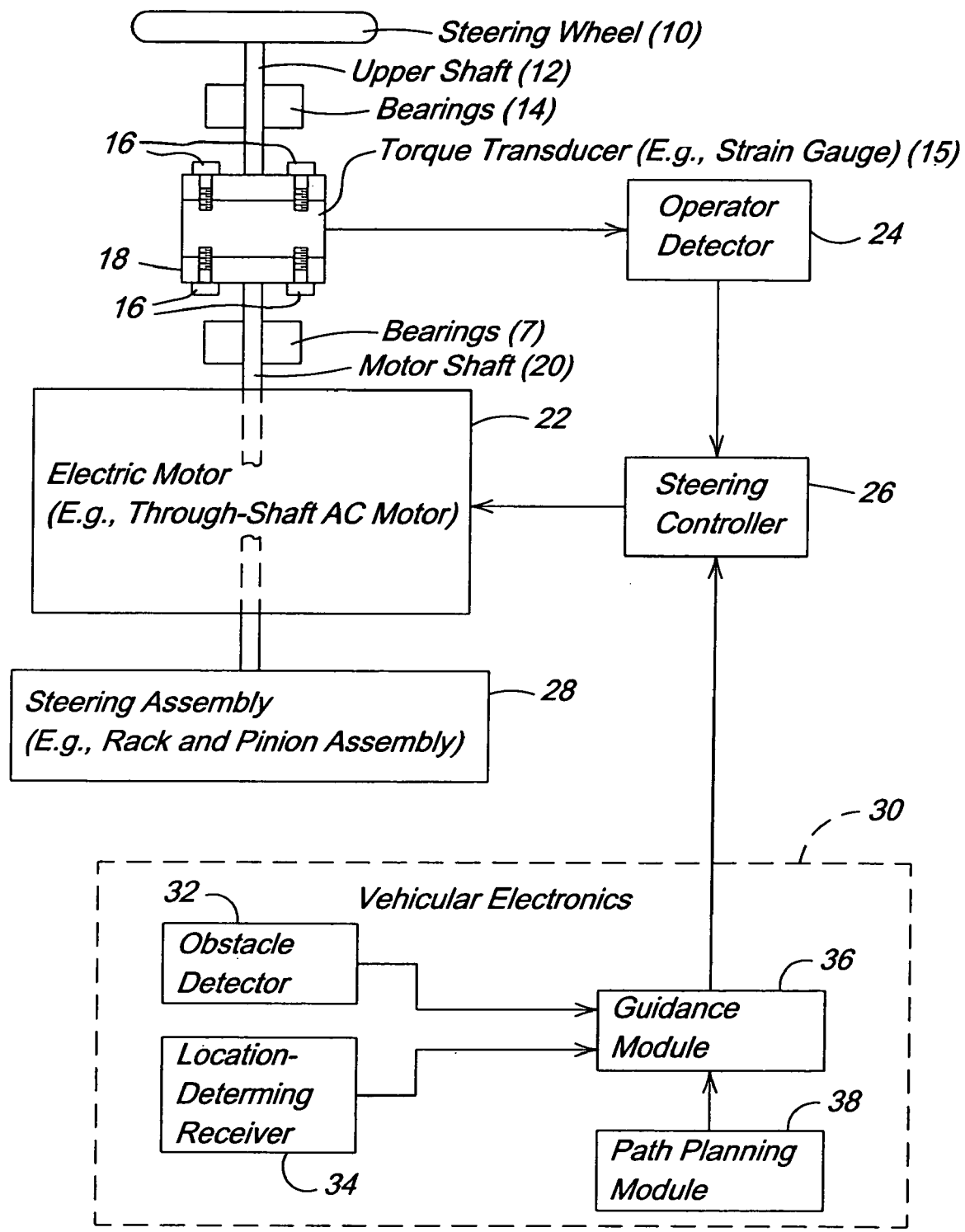
FIG. 1 is a block diagram of an electrical steering system for manned or unmanned operation of a vehicle.

FIG. 1. illustrates a block diagram of one possible embodiment of an electrical steering system. Other embodiments are possible and may fall within the scope of the claims. The electrical steering system comprises a steering wheel 10 that is connected to an upper shaft 12. A torque transducer 15 is mounted to or associated with the upper shaft 12. The upper shaft 12, the motor shaft 20 or both may include mounting hardware for mounting the torque transducer 15. The motor shaft 20 is associated with an electric motor 22. For the illustrative configuration of FIG. 1 where a through-shaft electric motor is used as the electric motor 22, one end of the motor shaft 20 is associated with the transducer 15, whereas the other end of the motor shaft 20 is connected to a steering assembly 28. An output of the torque transducer 15 is electrically or electromagnetically coupled to an operator detector 24 that detects the presence or absence of an operator of the steering wheel 10 or the vehicle. The operator detector 24 provides a status signal or status data to the steering controller 26 that indicates the presence or absence of the operator. The steering controller 26 is electrically or electromagnetically coupled to the electric motor 22. Vehicular electronics 30 may be coupled to the steering controller 26.

The vehicular electronics 30 includes an obstacle detector 32, a location-determining receiver 34, and a path planning module 38 that are coupled to a guidance module 36. The location-determining receiver 34 comprises a Global Positioning System (GPS) receiver, a GPS receiver with differential correction, a Loran receiver, a Loran C receiver or another receiver that provides location data on a location or position of a vehicle. The path planning module 38 may dynamically provide a path plan or access a path plan that is pre-programmed or stored in data storage of the vehicular electronics 30. The path plan specifies the position or location data versus time for the vehicle. The path plan may extend from an initial position to a destination position through various intermediate positions. The obstacle detector 32 comprises a detector for determining whether an obstacle is present near the path plan or within an obstacle detection zone of a vehicle. The obstacle detector 32 may warn the guidance module 36 of the estimated or actual location of an obstacle. The guidance module 36 may provide steering instructions to the steering controller 26, propulsion instructions to a propulsion controller, and braking instructions to a braking controller such that the vehicle follows a path plan. Further, the guidance module 36 may depart from the path plan or may momentarily stop to the vehicle to avoid striking an obstacle detected by the obstacle detector 32, to keep a certain minimum clearance from an obstacle or to otherwise take precautionary, evasive or safety measures.

The steering wheel 10 may be connected to the upper shaft 12 by a spline at the end of the upper shaft 12, a slot in the upper shaft 12 with a key, a clamp around the cylindrical outer surface of the upper shaft 12, a mounting flange or by any other suitable mechanical connection. The upper shaft 12 may be supported by radial bearings 14. The radial bearings 14 may be mounted in a housing or attached to a unibody structure, a frame or another structural component of a vehicle. As shown in FIG. 1, one end of the upper shaft 12 terminates in a mounting flange 18. Similarly, one end of the motor shaft 20 terminates in a mounting flange 18. The torque transducer 15 may be mounted to the mounting flanges 18 by fasteners 16, clamps, adhesive or other means. The output of the torque transducer 15 is electrically, electromagnetically or wirelessly coupled to an operator detector 24. The motor shaft 20 may be supported by its internal bearings alone or an optional bearing 17 may be added to support the portion of the motor shaft 20 near the torque transducer 15.

In an alternate embodiment, the mounting flanges 18 may be replaced by another mounting arrangement for the torque transducer 15. For instance, other mounting arrangements include clamps or securing mechanisms for securing a transducer to one or more shafts.

In general, the torque transducer 15 comprises a strain gauge, a piezoelectric sensor or another transducer or device for converting mechanical force into electrical energy. In one configuration, the torque transducer 15 may comprise an in-line rotary torque transducer 15 that senses torque within a desired range for a typical human operator. For example, the transducer may be capable of sensing torque from two-inch pounds to one-hundred inch pounds or greater. The transducer output may represent a sensed torque reading versus time, which is continuously or periodically sent from the transducer 15 to the operator detector 24 for processing.

In one embodiment, the electric motor 22 comprises a through-shaft alternating current (AC) electric motor. For example, the electric motor 22 may comprise a high-torque, gearless, brushless, through-shaft AC motor which does not significantly impede manual operation by a user when or if the operator applies rotational energy to the electric motor 22 via the steering wheel and the upper shaft 12. Any configuration of an electric motor may be used for the electric motor 22 including direct current motors, alternating current motors, switched reluctance motors, variable speed motors or otherwise provided that the electric motor 22 does not provide significant resistance to turning when not energized or has a clutch for decoupling the motor's rotor from the motor shaft 12 when the electric motor 22 is not energized. Although an electric motor 22 having a through-shaft is shown in FIG. 1 for illustrative purposes, the electric motor 22 may have a motor shaft that is not a through-shaft. Such a non-through motor shaft is oriented generally parallel to any steering shaft that interconnects the steering wheel 10 to the steering assembly 28 and such that the motor shaft is mechanically coupled (e.g., via a gear, rollers, chain or belt) for rotational movement with the steering shaft.

The steering assembly 28 may comprise a rack-and-pinion steering system, a mechanical linkage that converts rotation movement of a shaft (e.g., motor shaft 20) to lateral movement or another steering system. In one embodiment, the steering assembly 28 supports an Ackerman steering configuration. In another embodiment, the steering assembly 28 supports four-wheel steering configuration.

A steering wheel 10 is mechanically coupled to the upper shaft 12 for rotation with the upper shaft 12. An electric motor 22 (e.g., a through-shaft electric motor) is capable of receiving a rotational input from the upper shaft 12. A steering controller 26 is arranged for controlling the electric motor 22. A torque transducer 15 is connected to the upper shaft 12 for sensing a torque placed on the steering wheel 10. A steering assembly 28 for directing one or more wheels of the vehicle is mechanically coupled to the electric motor 22.

An operator detector 24 is electrically or electromagnetically coupled to the torque transducer 15. The operator detector 24 detects a presence of the operator by torque meeting or exceeding a threshold minimum torque level. The operator detector 24 sends an operator present or operator absent signal to the steering controller 26.

The steering controller 26 follows a steering command issued by a guidance module 36 when an operator absent status signal is provided to the steering controller 26. The steering controller 26 follows, defers to or does not interfere with a steering commend issued by a human operator via the steering wheel 10 when an operator present signal is provided to the steering controller 26. The steering controller 26 may assist the operator by providing power-assisted steering or power steering when the operator is present to amplify a steering operator's physical input to the steering wheel 10. Alternatively, the steering controller 26 may not send any steering commands to the electric motor 22 other than to de-energize or shut-down the electric motor 22 or to decouple the electric motor 22 from the mechanical connection between the steering wheel 10 and the steering assembly 28.

The steering controller 26 has a first mode in which the human operator turns a shaft of the electric motor 22 by application of force to the steering wheel 10 and a second mode in which the steering controller 26 turns the shaft by the application of electrical energy to the electric motor 22, consistent with steering commands from a guidance module 36. A failure mode may represent a failure, malfunction or performance problem associated with at least one of the following: electric motor 22, the operator detector 24, the steering controller 26, and the torque transducer 15. The failure mode supports immediate and reliable operation in the first mode or manual turning of the steering wheel 10 by the user that results in turning of the steerable wheels of the vehicle. In one configuration, to maintain reliable steering control of the vehicle, the steering controller 26 switches from the first mode to the second mode if the operator detector 24 does not provide an operator present signal within a predefined time interval.

Figure 2:
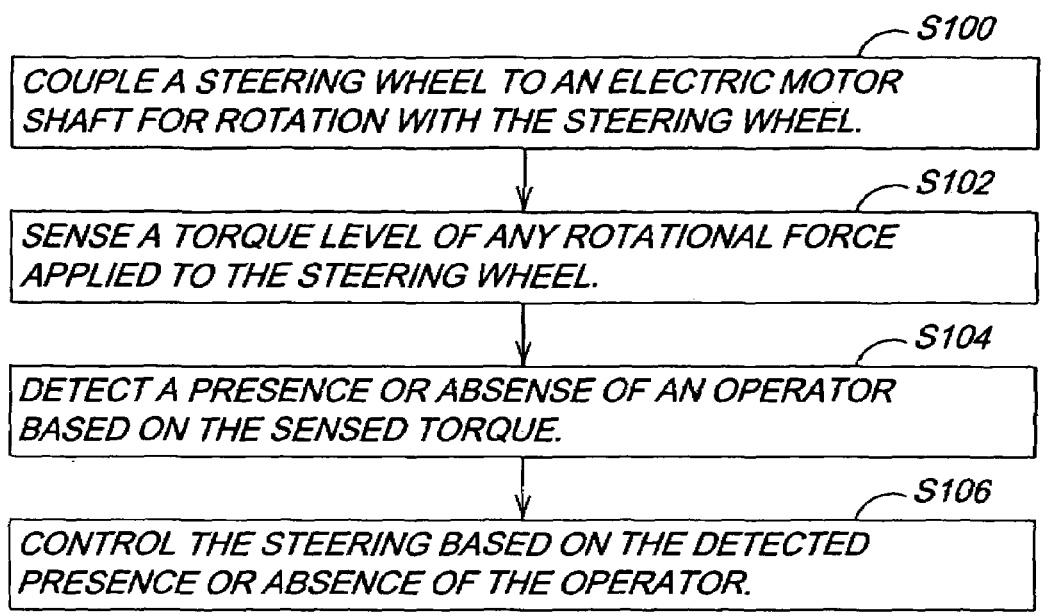
FIG. 2 is a flow chart of one illustrative example of a method of controlling an electrical steering system for manned and unmanned operation.

FIG. 2 is a flow chart on a method for controlling an electrical steering system for manned or unmanned operation. The method of FIG. 2 begins in step S100.

In step S100, a steering wheel 10 is mechanically coupled to an electric motor shaft for rotation with an the steering wheel 10. For example, the steering wheel 10 is mechanically coupled to the electric motor 22 via an upper shaft 12 attached to the steering wheel 10.

In step S102, a torque transducer 15 senses a torque level of any rotational force applied to the steering wheel 10. The torque transducer 15 may comprise an in-line torque transducer 15 or another transducer associated with the motor shaft 20.

In step S104, an operator detector 24 detects a presence or absence of an operator based on the sensed torque. For instance, an operator detector 24 may detect a presence of the operator by a torque meeting or exceeding a threshold minimum torque level. The operator detector 24 may send an operator present status signal or an operator absent status signal to the steering controller 26, depending upon the sensed torque level(s) or a statistical interpretation thereof.

In step S106, a steering controller 26 controls the steering based on the detected presence or absence of the operator. The steering controller 26 may follow a steering command issued by a guidance module 36 when an operator absent signal is outputted. The steering controller 26 may follow a steering command issued by a human operator via the steering wheel 10 when an operator present signal is outputted. However, the steering controller 26 may be configured, but need not be configured, to provide power assist to the operator during operator control of the steering.

Figure 3:
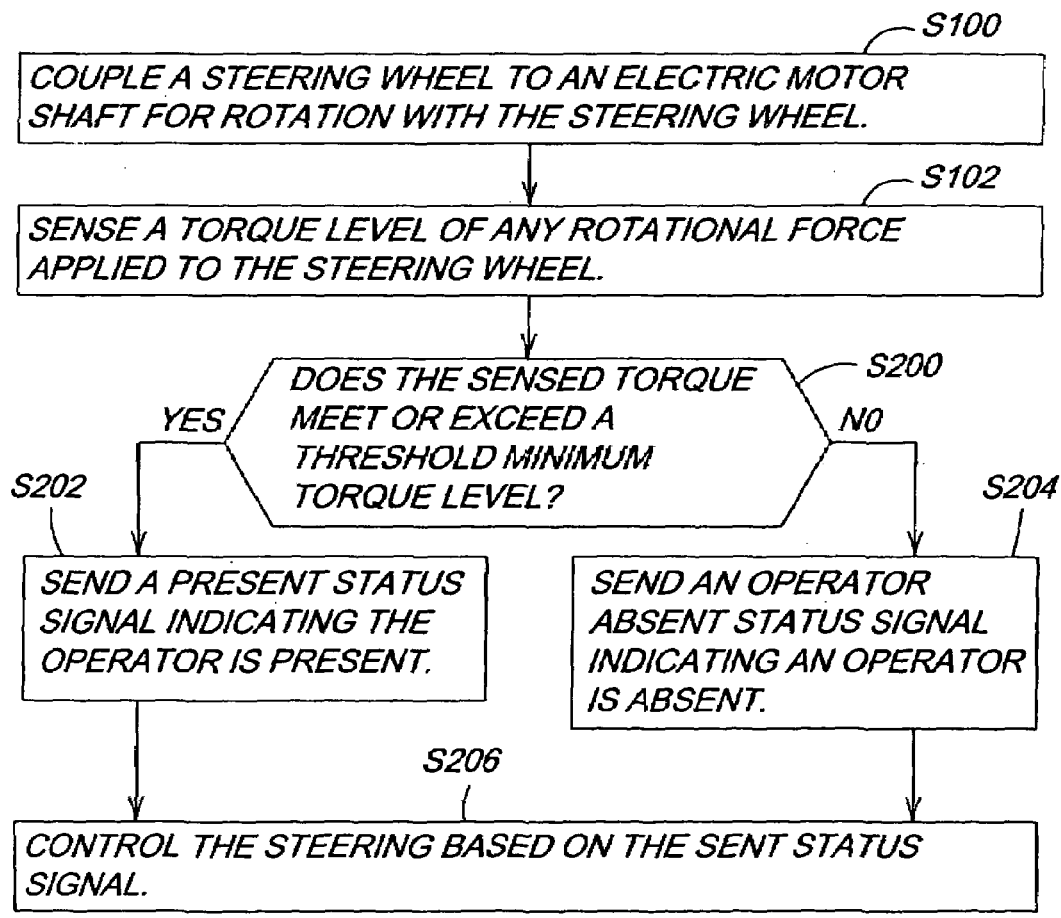
FIG. 3 is a flow chart of another illustrative example of a method of controlling an electrical steering system.

FIG. 3 shows another flow chart of a method for controlling an electric steering system. The method of FIG. 3 is similar to the method of FIG. 2, except the method of step S200, step S202, and step S204 collectively replace step S104 of FIG. 2. In addition, step S206 of FIG. 3 replaces step S106 of FIG. 2.

In step S200, an operator detector 24 or data processor determines whether or not the sensed torque (e.g., torque levels versus time stamps) of step S102 meets or exceeds a threshold minimum torque value. The threshold minimum torque value may be selected by any of the following methods, among others: empirical tests, technical tests, operator surveys, product focus groups or a user profile. With respect to selection of a threshold minimum torque based on a user profile, the threshold minimum torque may be less for a female operator than for a male operator. Similarly, the threshold minimum torque may be less for a lower weight person than for a higher weight person. In one embodiment, piezoelectric sensors are built into the driver's seat and the user profile or threshold minimum torque value is selected based on the operator's weight.

If the sensed torque level meets or exceeds a threshold minimum torque level, the method continues in step S202. However, if the sensed torque level does not meet or exceed a threshold minimum torque level, the method continues in step S204.

In step S202, an operator detector 24 sends a present status signal indicating the operator is present. For example, the operator detector 24 sends the present status signal to the steering controller 26.

In step S204, the operator detector 24 sends an operator absent signal indicating an operator is absent, unconscious, sleeping, fatigued, ill, injured or incapacitated. For instance, the operator detector 24 sends the absent status signal to the steering controller 26.

After step S202 or step S204, the method continues in step S206. In step S206, the steering controller 26 controls the steering based on the sent status signal. The sent status signal means the present status signal or the absent status signal. The controller 26 controls the steering system differently if the absent status signal is received versus the present status signal.

Figure 4:
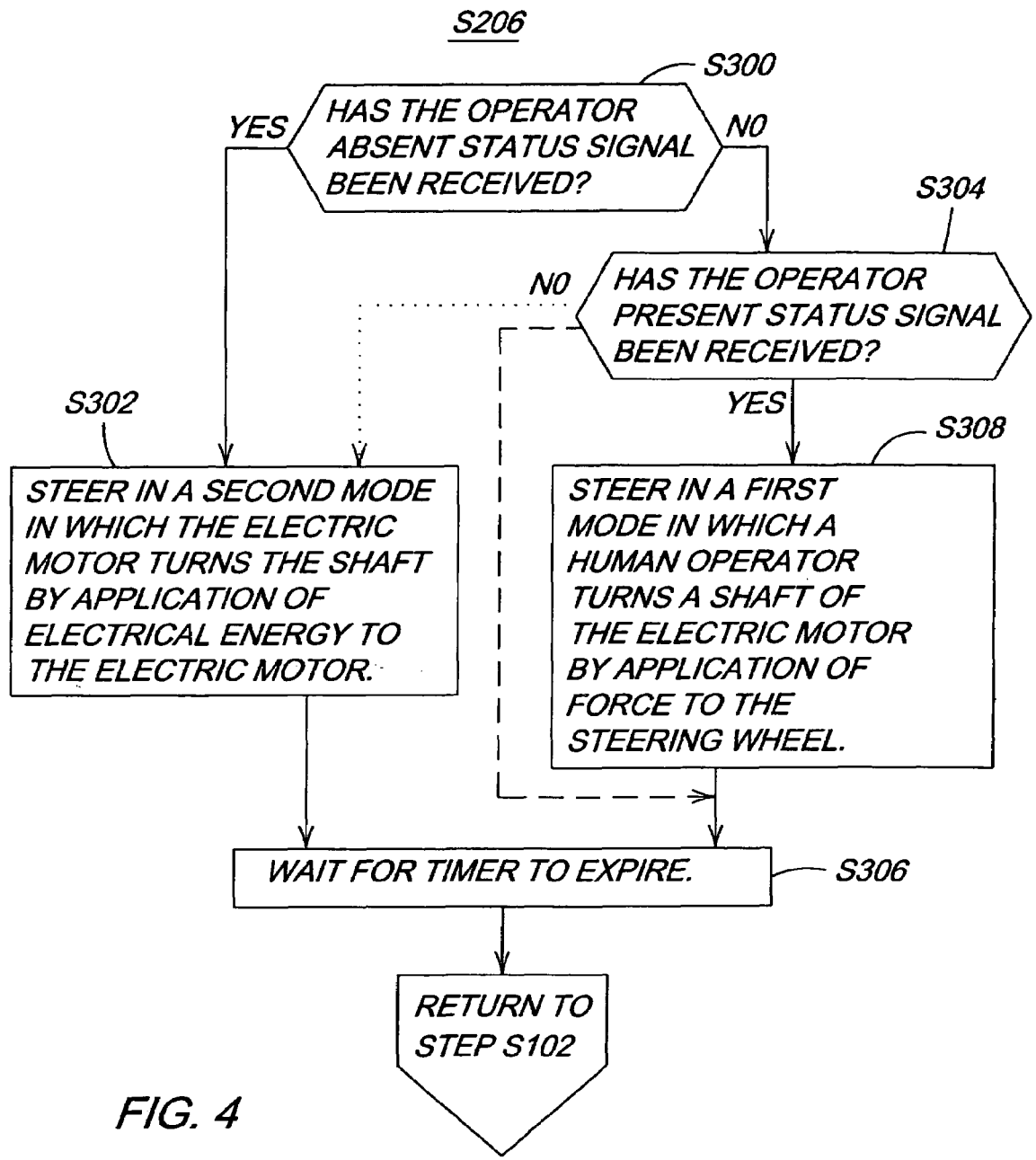
FIG. 4 illustrates a procedure for controlling the steering of a steering system in greater detail than FIG. 3.

FIG. 4 illustrates step S206 in greater detail than FIG. 3 does. The procedure of FIG. 4 begins in step S300.

In step S300, the steering controller 26 determines whether the operator absent status signal has been received. If the operator absent status signal has been received, the method continues with step S302. However, if the operator status signal as not been received, the method continues with step S304.

In step S302, the steering controller 26 steers in a second mode in which the electric motor 22 turns the motor shaft 20 by application of electrical energy to the electric motor 22 in response to the guidance module 36 or the vehicular electronics 30. In turn, the motor shaft 20 turns the steerable wheels via the steering assembly 28 to direct the vehicle.

In step S304, the steering controller 26 determines whether the operator present status signal has been received. If the operator present status signal has been received, the method continues with step S308. However, if the operator status signal has not been received, then the method may continue in accordance with one of two alternative techniques. Under a first technique, indicated by dashed lines, the method continues with step S306. Under a second technique, indicated by dotted lines, the method continues with step S302 and the method directs the steering controller 26 to steer in the second mode.

In step S308, the steering controller 26 steers in first mode in which a human operator turns a shaft of the electric motor 22 by application of force to the steering wheel 10. Here, the user manually operates the steering wheel 10 which is ultimately coupled to the steering assembly 28 via the electric motor 22 (e.g., an electric motor having a through-shaft). The steering assembly 28 turns the steerable wheels via the steering assembly 28 to direct the vehicle in accordance with operator input at the steering wheel 10. The steering controller 26 may not, but need not, provide user-assistance or amplification of manual user input to the steering wheel 10 by activating the electric motor 22 during the first mode to assist manual user input.

Step S306 may follow multiple steps in FIG. 4, including step S302, step S304 or step S308. In step S306, the electrical steering system waits for a timer to expire. The timer may be set to any suitable interval and may range from milliseconds to minutes, depending upon the algorithm chosen to steer the vehicle. In one embodiment, the interval may provide some delay or hysteresis such that the steering system does not oscillate from a first mode to a second mode because the operator is on a straight road or has not applied any force to the steering wheel 10 for a brief instant. In another embodiment, the steering controller 26 may switch to the second mode to maintain control of the vehicle if an operator is present, but does not apply sufficiently frequent input to maintain the steering system in the first mode. After step S306, the method may return to step S102.

The loop from step S306 to step S102 allows for changes in the operating mode during operation of the vehicle from one time interval to the next time interval. In one example, where the steering is in the first mode during the previous interval, if the operator detector 24 does not provide an operator present signal within a subsequent time interval of the timer, the steering controller 26 switches from the first mode to the second mode during or after the subsequent interval. Here, the operator may have fallen asleep during the subsequent interval or may have become incapacitated during the subsequent interval. The shorter the interval, the greater the chance that a crash or accident is avoided from a sleeping, fatigued, dozing, inattentive or incapacitated operator. In another example, where steering is in a second mode during a previous interval or in a current interval, a failure, malfunction or performance problem of at least one of the electric motor 22, the operator detector 24, the steering controller 26, and the torque transducer 15 may result in switching from the second mode to the first mode during the current interval immediately after discovery of the failure, malfunction or performance problem. In the first mode, an operator can maintain control or seize control of the vehicle if the vehicle stops steering on its own and such a failure is apparent from operation of the vehicle, diagnostic gauges, warning instrumentation or the like.

Having described the preferred embodiment, it will become apparent that various modifications can be made without departing from the scope of the invention as defined in the accompanying claims.

What is claimed is:

1. An electrical steering system comprising:
   an upper shaft;
   a steering wheel coupled to the upper shaft for rotation with the upper shaft;
   an electric motor capable of receiving a rotational input from the upper shaft;
   a torque transducer connected to the upper shaft for sensing a torque placed on the steering wheel;
   a steering assembly coupled to at least one of the electric motor and the upper shaft;
   an operator detector electrically or electromagnetically coupled to the torque transducer, the operator detector detecting a presence or an absence of the operator for a corresponding time interval, the presence of the operator for the corresponding time interval determined by the sensed torque meeting or exceeding a threshold minimum torque level; and
   a steering controller for controlling the electric motor based upon at least one of the detected presence and the detected absence, the steering controller having a first mode comprising a manned mode to turn the shaft with assistance of the operator consistent with the detected presence; the steering controller having a second mode comprising an unmanned mode to the turn the shaft without the operator applying any torque to the steering wheel consistent with the detected absence.

2. The electrical steering system according to claim 1 wherein the electric motor comprises a through-shaft electric motor regardless of the sensed torque level and wherein one end of the motor shaft is connected to the upper shaft and another end is connected to the steering assembly.

3. The electrical steering system according to claim 1 wherein the torque transducer comprises at least one of the following: a strain gauge and a piezoelectric sensor.

4. The electrical steering system according to claim 1 where in the first mode the operator turns a shaft of the electric motor by application of force to the steering wheel and in a second mode the steering controller applies electrical energy to the electric motor to facilitate turning of the shaft without any assistance of the operator.

5. The electrical steering system according to claim 1 wherein the operator detector sends an operator present or operator absent signal to the steering controller.

6. The electrical steering system according to claim 1 wherein the steering controller follows a steering command issued by a guidance module when an operator absent signal is provided to the steering controller.

7. The electrical steering system according to claim 1 wherein the steering controller follows a steering command issued by a human operator via the steering wheel when an operator present signal is provided to the steering controller.

8. The electrical steering system according to claim 1 wherein a failure mode of at least one of the electric motor, the operator detector, the steering controller, and the torque transducer allows operation in the first mode.

9. The electrical steering system according to claim 1 wherein the steering controller switches from the first mode to the second mode if the operator detector does not provide an operator present signal within a predefined time interval.

10. The system according to claim 1 wherein the operator detector provides a status signal indicating whether the sensed torque meets or exceeds the minimum threshold level for a corresponding time interval indicative of an operator steering the steering wheel.

11. A method for controlling an electrical steering system comprising:
coupling a steering wheel to an electric motor shaft for rotation with an the steering wheel;
sensing a torque level of any rotational force applied to the steering wheel;
detecting a presence or absence of an operator for a corresponding time interval, the detected presence based on the sensed torque meeting or exceeding a threshold minimum torque level; and
controlling the steering in a first mode or a second mode based on the detected presence or absence of the operator; the first mode comprising a manned mode to turn the shaft with assistance of the operator consistent with the detected presence; the second mode comprising an unmanned mode to the turn the shaft without the operator applying any torque to the steering wheel consistent with the detected absence.

12. The method according to claim 11 wherein the detecting comprises sending a operator present or operator absent signal to the steering controller.

13. The method according to claim 11 wherein the controlling comprises following a steering command issued by a guidance module when an operator absent signal is outputted.

14. The method according to claim 11 wherein the controlling comprises following a steering command issued by a human operator via the steering wheel when an operator present signal is outputted.

15. The method according to claim 11 wherein the controlling comprises establishing a first mode in which human operator turns a shaft of the electric motor by application of force to the steering wheel and establishing a second mode in which the steering controller turns the shaft by the application of electrical energy to the electric motor.

16. The method according to claim 15 wherein a failure mode of at least one of the electric motor, the operator detector, the steering controller, and the torque transducer allows operation in the first mode.

17. The method according to claim 15 wherein the controlling switches from the first mode to the second mode if the operator detector does not provide an operator present signal within a predefined time interval.

18. The method according to claim 15 wherein the electric motor provides power assistance to the operator's manual turning of the shaft in the first mode.

* * * * *